June 16, 1931.  S. T. FREAS ET AL  1,810,823

CIRCULAR SAW

Filed June 13, 1930    2 Sheets-Sheet 1

Inventors:
Samuel T. Freas
Charles A. Gehr
by their Attorneys

June 16, 1931.　　S. T. FREAS ET AL　　1,810,823
CIRCULAR SAW
Filed June 13, 1930　　2 Sheets-Sheet 2
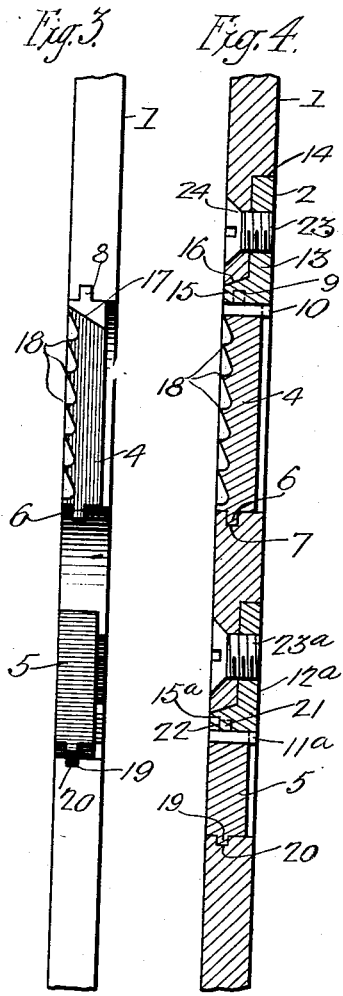
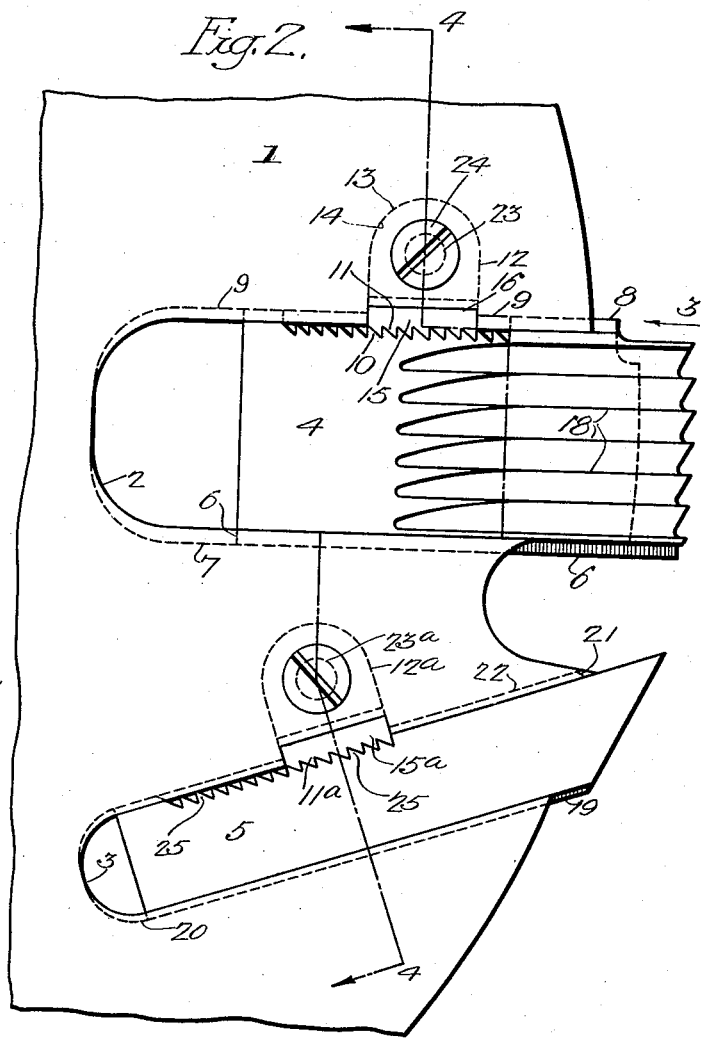
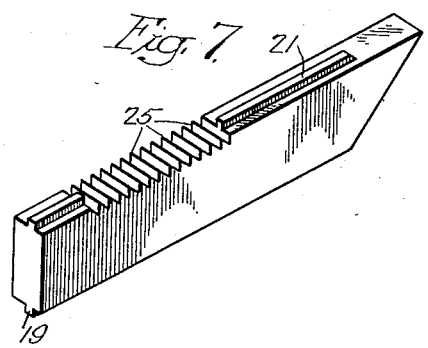
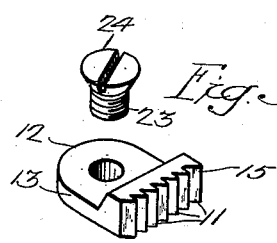
Inventors
Samuel T. Freas
Charles A. Gehr
by their Attorneys Patented June 16, 1931

1,810,823

UNITED STATES PATENT OFFICE

SAMUEL T. FREAS, OF TRENTON, NEW JERSEY, AND CHARLES A. GEHR, OF WISSINOMING, PENNSYLVANIA, ASSIGNORS TO HENRY DISSTON & SONS, INCORPORATED, OF TACONY, PENNSYLVANIA, A CORPORATION OF PENNSYLVANIA

CIRCULAR SAW

Application filed June 13, 1930. Serial No. 460,968.

The object of our invention is to improve the construction of a circular saw which is particularly adapted as a groover and which is provided with detachable teeth. In the present instance the teeth are arranged in pairs, one tooth of each pair being a grooving tooth and the other a finishing tooth. The invention relates to the particular construction of the devices by which the teeth are secured to the body of the saw.

In the accompanying drawings:

Fig. 2 is an enlarged side view illustrating a pair of teeth and a device for securing the teeth in position, the view being on the opposite side from that of Fig. 1;

Fig. 3 is an end view looking in the direction of the arrow 3, Fig. 2;

Fig. 4 is a sectional view on the line 4—4, Fig. 2;

Fig. 5 is a detached perspective view showing one of the securing devices and its screw;

Fig. 7 is a detached perspective view of one of the grooving teeth.

Figure 1:
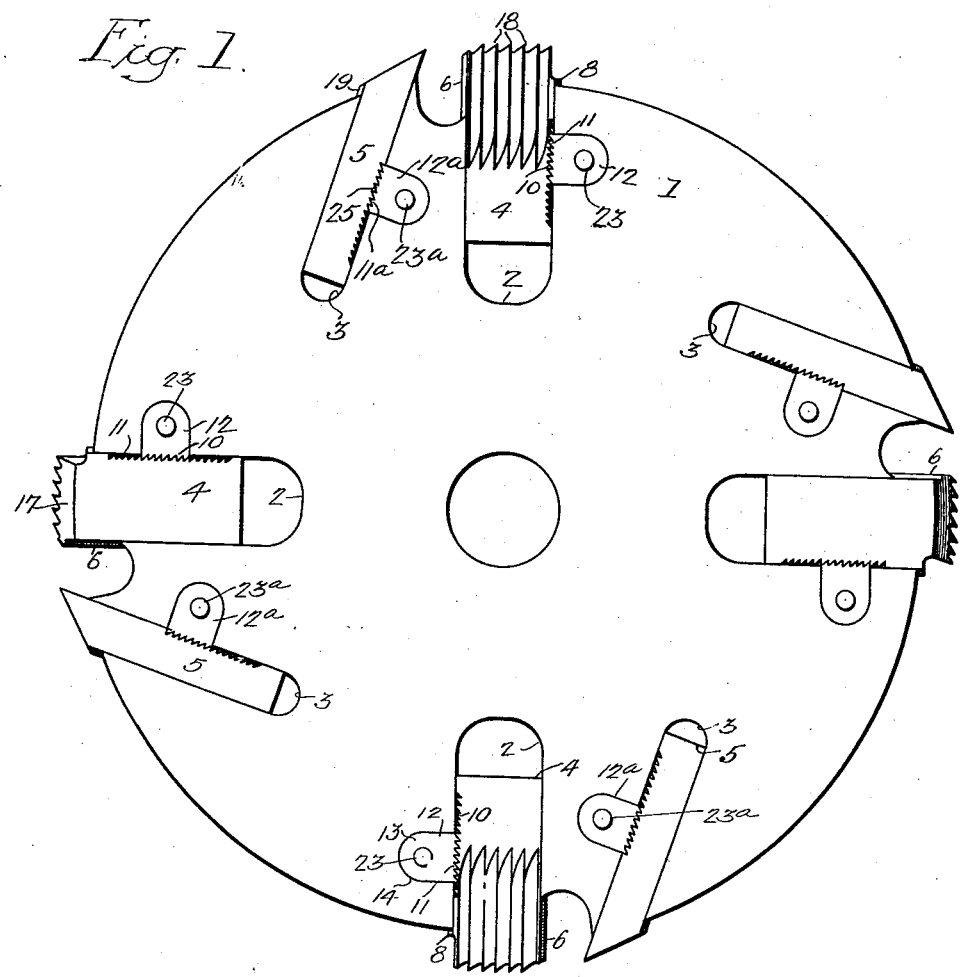
Fig. 1 is a view of one side of a saw illustrating our invention.
Figure 6:
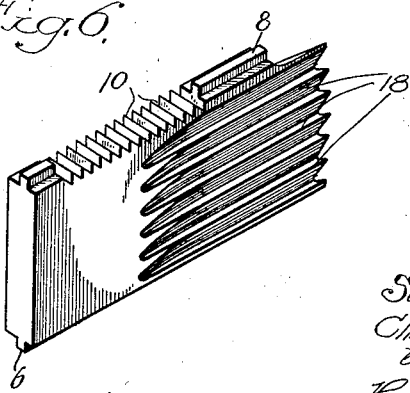
Fig. 6 is a detached perspective view of one of the finishing teeth.

1 is the body of the circular saw, having recesses 2 and 3 for the teeth 4 and 5 respectively. The tooth 4 is a finishing tooth in the present instance and has a rib 6 on one edge fitting a groove 7 in one wall of the recess 2 and has short ribs 8 at the opposite edge fitting a groove 9 in the other wall of the recess 2. In the edge having the short ribs is a series of teeth 10, which are shaped as shown in Fig. 2 and engaging the teeth 10 are teeth 11 on a plate 12, which is made as shown in Fig. 5, the body 13 of the plate being located in a recess 14 in the body of the saw, while the enlarged toothed end 15 of the plate extends through a slot 16 in the wall of the recess 2. The end 15 is the same thickness as the body 1 of the saw, and is flush with both surfaces of the body. When the tooth 4 is adjusted to the proper position, the plate 12 is fitted in the recess 14 and is held in place by a screw 23, having a beveled head 24, as shown in Fig. 7, the head of the screw being flush with the surface of the saw body. The teeth of the plate engage the teeth on the edge of the finishing tooth 4. It will be noticed that the teeth 10 are 91° on one side and 89° on the other side, and the teeth 11 are cut to correspond with the teeth 10. The teeth 11 will resist any inward thrust of the tooth during the cutting operation. In the present instance the tooth 4 is beveled on one side as at 17 and has a series of elongated ribs 18 on the opposite side in the form of teeth and these ribs act as finishing teeth after the tooth 5 has cut a kerf in the work. It will be noticed in referring to Fig. 1 that the teeth 4 are alternately arranged in the plate, the teeth being set in their recesses so that the finishing edge of each tooth is nearer the one face of the saw than the other face, so that one wall of the kerf is finished by one set of teeth and the other wall is finished by the other set of teeth. The grooving teeth 5 are held in place in the same manner as the teeth 4. The tooth 5 has a rib 19 in one edge, which is adapted to a groove 20 in one wall of the recesses 3 in the body of the saw. The other edge of the tooth 5 has a short rib 21 adapted to a groove 22 in the opposite wall of the recess 3 and the wall is also recessed to receive the toothed portion 15a of a plate 12a, which is held in place by a screw 23a, the plate and screw being similar in construction to the plate and screw 12 and 23, shown in Fig. 5. The teeth 11a of the plate 12a engage teeth 25 at the edge of the saw tooth 5 and these teeth are shaped similar to the teeth 10 and 11 described above, and act to resist any inward thrust of the saw tooth.

By the above construction it will be seen that both teeth 4 and 5 are rigidly held in position by a very simple device, which interlocks with the teeth and which can be readily removed so that the tooth can be quickly adjusted and after adjustment the device can be reinserted and secured in position.

While we have shown and described a certain type of saw having grooving teeth and finishing teeth of peculiar form, it will be understood that the invention can be used in securing teeth differing from the form of that shown, to the body of the circular saw.

We claim:

The combination in a body of a circular saw having an elongated recess in its periphery, of a tooth adapted to the recess, and having a tongue and groove connection with one wall of the recess, said tooth having a series of retaining teeth at one edge, one wall of the recess having a notch extending entirely through the body of the saw; a shallow recess on one side of the body extending to said notch; an angular plate, the body portion of the said plate being adapted to the recess and flush with the side of the saw, the other portion of the plate being located in the notch of the recess for the tooth and extending to the opposite side of the saw; teeth on the said portion of the plate extending the full width of the tooth and engaging the retaining teeth of the tooth; and means for securing the angular plate within the recess of the body of the saw.

SAMUEL T. FREAS.
CHARLES A. GEHR.